Patented Feb. 20, 1951

2,542,766

UNITED STATES PATENT OFFICE 2,542,766

PRODUCTION OF AMIDES

William F. Gresham, Wilmington, Del., assignor to E. I. du Pont de Nemours & Company, Wilmington, Del., a corporation of Delaware No Drawing. Application November 10, 1948, Serial No. 59,415

11 Claims. (Cl. 260—561)

This invention relates to the synthesis of organic nitrogen compounds, and more particularly to the synthesis of organic compounds containing amido or cyano nitrogen, by reaction between organic unsaturated compounds containing olefinic unsaturation, carbon monoxide, and ammonia or substituted ammonia. This application is a continuation-in-part of my copending application S. N. 593,333, now abandoned, which was filed on May 11, 1945.

An object of this invention is to provide a method for preparing organic nitrogen compounds from relatively inexpensive starting materials. Other objects will appear hereinafter.

It has been discovered, in accordance with this invention that carbon monoxide and ammonia or substituted ammonias react under the conditions hereinafter set forth with organic compounds containing olefinic unsaturation to produce compounds containing amido or cyano nitrogen.

The organic compounds containing olefinic unsaturation which may be used in accordance with this invention are the olefinic hydrocarbons and other organic compounds containing a (i. e., at least one) non-benzenoid double bond between carbon atoms. Suitable examples of such compounds are the olefinic hydrocarbons themselves, such as ethylene, propylene, the butylenes, the pentenes, the hexenes, cyclohexene, cracked petroleum fractions, butadiene, isoprene, polymerized dienes, styrene, alpha-methyl styrene, vinyl cyclohexene, pinene, limonene, cyclohexadiene; unsaturated oxygenated compounds such as allyl alcohol, methallyl alcohol, vinyl acetate, methyl methacrylate, methyl crotonate, methyl vinyl ketone, cyclohexene carboxylic acid, esters of cyclohexene carboxylic acids, methallyl methacrylate, acrolein; acrylonitrile, vinyl chloride, allyl amine, acrylamide, etc.; and, in general, the unsaturated hydrocarbons, esters, ethers, carboxylic acids, nitriles, amides, amines, aldehydes and ketones containing non-benzenoid olefinic unsaturation.

The compounds which may react with carbon monoxide and organic compounds containing olefinic unsaturation, in accordance with the invention, include ammonia and substituted ammonias (e. g., monoamines, diamines, polyamines, etc., whether saturated or unsaturated), such amines having at least one hydrogen attached to amino nitrogen. In specific embodiments, these reactants are compounds of the formula $NHR_2$ in which R represents hydrogen or an organic radical. It is not essential that both groups represented by R be similar. In the simplest embodiments of the invention, R is a member of the class consisting of hydrogen and alkyl groups. However, R may be alkenyl, cycloalkenyl, aryl, aralkyl, cycloalkyl, etc., or derivatives thereof containing substituent groups, such as hydroxyl, amino, alkoxy, or the like.

The reaction between the unsaturated compound, carbon monoxide and ammonia, or substituted ammonia, according to the invention, is conducted in the presence of a catalyst at elevated temperatures, preferably about 150° to 350° C., or higher. It is generally desirable to employ superatmospheric pressures, preferably above about 50 atmospheres. The maximum pressure is determined by the strength of available equipment and may be as high as 2000 to 3000 atmospheres or even higher. Optimum results are obtained at a temperature of about 160° to 260° C. under a reaction pressure of about 100 to 2000 atmospheres. In general, pressure and temperature are interdependent variables. The catalysts which are operative in the present invention include organic compounds of cobalt, e. g., cobalt carbonyl and also cobalt salts of organic carboxylic acids. A preferred catalyst is cobalt carbonyl, which may be used in any desired quantity, but which gives excellent results when present to the extent of only a few tenths of per cent, based on the total weight of the reaction mixture. Other suitable catalysts are cobalt-substituted amides, cobalt salts of organic carboxylic acids, and organic cobalt compounds in general, especially those which are soluble in the reaction mixture. When cobalt carbonyl is used as the catalyst, it is preferable to employ an inert solvent therefor, such as benzene, cyclohexane, saturated aliphatic esters, alkanes, ethers or the like. When cobalt itself, or organic compounds thereof, are employed as catalysts, the reaction mixture generally yields, upon distillation, a heel containing chemically combined cobalt in a form which is itself a very satisfactory catalyst for the reaction, and hence can be recycled and re-used repeatedly with make-up amounts of the reactants.

The reaction is preferably conducted by heating a mixture of approximately equimolar quantities of the unsaturated compound and ammonia, or substituted ammonia, under a high pressure of carbon monoxide in a suitable pressure-resistant vessel in the presence of one of the aforesaid catalysts. The process may be conducted in either the liquid phase or in the vapor phase. The resulting product is thereafter removed from the reaction vessel, and the nitrogen-containing compounds produced by the reaction are separated by any suitable method, such as by fractional distillation. The following equation represents the general method for the preparation of organic amides, in accordance with this invention:

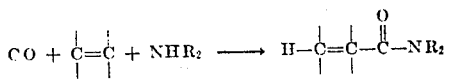

wherein R has the same meaning as has been stated above. In accordance with this invention, yields of organic amides as high as 65% to 75% based on the initial weight of unsaturated compound and ammonia, or substituted ammonia, are obtained.

It has been disclosed quite recently (U. S. 2,422,632) that aliphatic amides can be prepared by passing a mixture of olefin, carbon monoxide and an aminating agent over a dehydrating catalyst such as phosphoric acid, phosphates, cobalt oxide, iron oxide, etc. (cf. also abandoned application S. N. 416,463 which was filed October 25, 1941). However, it was not known prior to the present applicant's discovery that the cobalt content of the aforementioned cobalt oxide is highly specific and may, in fact, be present in virtually any soluble form, preferably in the form of an organic compound of cobalt which is soluble in at least one of the ingredients of the reaction mixture. This surprising discovery permits the use of a homogeneous reaction system. More particularly it permits the recycling of the recovered, soluble cobalt-containing compounds which may be produced from metallic cobalt or cobalt oxide in the process of S. N. 416,463, and furthermore makes possible the elimination of solid cobalt catalysts, such as cobalt oxide, altogether. It also permits the use of very small amounts of catalysts since extremely minute quantities of soluble organic compounds of cobalt are effective catalytically in the process of the invention.

This invention is illustrated further by means of the following examples:

*Example 1.*—A mixture containing (molal quantities) 1.1 ethylene: 1.0 ammonia: 1.2 carbon monoxide: 0.8 benzene: 0.002 cobalt (present as cobalt naphthenate) was passed continuously through a reaction tube at a temperature of 259° C., under a pressure of 605 atmospheres, the contact time being 4 minutes. Conversion to propionamide was 10.9%, and smaller amounts of diethyl ketone and formamide also were produced.

*Example 2.*—A mixture containing 42.6 grams of cobalt acetate, 56.1 grams of ethylene and 34.1 grams of ammonia was heated with carbon monoxide for 0.8 hr. in a silver-lined reaction vessel at 195° to 205° C. under a pressure of 600 to 700 atmospheres. Distillation of the resulting product gave 34.2 grams of crude propionamide, B. P. 70°/3 mm. to 98° C./8 mm.

*Example 3.*—A reaction mixture containing 88.4 grams of crude propionamide containing chemically combined cobalt (purplish white crystals, prepared by reacting CO with ethylene and ammonia in the presence of cobalt carbonyl and removing the lower boiling constituents by distillation), 17 grams of ammonia, and 28 grams of ethylene was heated in a silver-lined shaker tube for 1 hour at 235° to 285° C. with carbon monoxide under a pressure of 555 to 800 atmospheres. The resulting product contained 95.9 grams of a cream-colored fluffy powder. That the amount of chemically combined cobalt present as impurity in the propionamide employed in the initial reaction mixture was sufficient to catalyze the reaction between ethylene, ammonia and carbon monoxide was shown by the fact that a pressure drop of 200 atmospheres occurred during the reaction. Distillation of the reaction product gave propionamide, and also a small amount of foreshot (7.6 grams) from which propionitrile (2.9 grams, boiling point, 96° to 97° C.) was obtained.

*Example 4.*—A sample of the N,N-dimethyl amide of 3-cyclohexene-1-carboxylic acid was prepared by heating dimethyl amine with the methyl ester of 3-cyclohexene-1-carboxylic acid at 228–240° C. under autogenous pressure. This amide had a boiling point of 79° to 81° C. at 3 mm. pressure, and had a refractive index (25° C., D line) of 1.4953. A mixture containing 52.4 grams of this amide, 16 grams of dimethyl amine and 10 cc. of 15.5% solution of cobalt carbonyl in cyclohexane was heated for 1 hour at 260° to 275° C. with carbon monoxide under a pressure of 640 to 720 atmospheres total. Distillation of the product gave 51.2 grams of material (boiling point 160° to 210° C., at 3 to 7 mm.) which, upon cooling, was about half solid and half liquid. The crystalline portion contained 12.48% N, and the liquid portion contained 11.44% N (theory for the N,N,N',N'-tetramethyl diamide of isomeric cyclohexane dicarboxylic acids, 12.38%).

*Example 5.*—Into a silver-lined shaker tube was charged 4.25 grams of cobalt propionate, 36.5 grams of propionamide, 17.0 grams of ammonia and 28.0 grams of ethylene. This charge was heated with shaking for 0.5 hour at 150° C. under 395 to 400 atmospheres of CO pressure, then 1.0 hour at 235° to 250° C. with carbon monoxide under 750 to 820 atmospheres pressure. The overall pressure drop was 170 atmospheres. A total of 86.5 grams of reddish brown liquid and solid product was recovered and taken up in benzene. After removing the benzene, ammonia and a small quantity of ammonium carbamate at 20 mm. pressure in a steam bath, there remained 60.4 grams of crude cobalt (combined)-containing propionamide corresponding to a 27% net conversion of the ethylene and ammonia charged to propionamide. This crude propionamide was distilled, giving 9.6 grams of propionamide (white crystals, boiling point, 214° C.) and 46.8 grams of crude cobalt-containing propionamide heel. This heel was recycled with 17 grams of ammonia and 28.0 grams of ethylene giving 67.1 grams of distilled propionamide, corresponding to a 44% net conversion of the ethylene and ammonia charged to propionamide. The distillation heel from the recycle step amounted to 7.1 grams and contained 73% of the cobalt recycled.

*Example 6.*—A mixture containing 52.1 grams of vinylcyclohexene, 45 grams of dimethylamine and 20 cc. of a 15.5% solution of cobalt carbonyl in cyclohexane was heated at 225° to 240° C. for 1.5 hours under a pressure of 600 to 750 atmospheres of carbon monoxide. Distillation of the resulting reaction mixture resulted in 26.6 grams of material, boiling in the range of 95 to 114° C. under a pressure of 3 mm.; refractive index at 25°, 1.4950. Nitrogen analysis and the neutral equivalent of the carboxylic acid derived from the product indicated that carbon monoxide and dimethyl amine had been added to one of the double bonds with the formation of an N,N-dimethylamide, $C_{11}H_{19}ON$. Since 58.7% of the vinylcyclohexene was recovered in the distillation, this corresponds to a yield of about 71%. The other product of the reaction was dimethylformamide which was formed in 72.4% yield based on the dimethyl amine charged. It was found in a separate experiment that the dimethylformamide could be recycled. At 290 to 300° C. using a cobalt catalyst and 650 to 710 atmospheres total pressure, 27 grams of vinyl cyclohexene and 73.1 grams of dimethylformamide was 16.3% converted to the same N,N-dimethylamide.

*Example 7.*—A mixture consisting of 128 cc. of cyclohexane, in which was dissolved a few tenths of a gram of cobalt carbonyl, 56.1 grams of butene-1, and 17 grams of ammonia, was heated in a shaker tube at 240 to 245° C. with carbon monoxide under a pressure of 600 to 870 atmospheres for 1.0 hour. The resulting product was withdrawn and distilled, yielding n-butyramide (17.8% conversion) and a distillation heel containing dissolved cobalt. The distillation heel was effective as a catalyst for converting additional quantities of butene-1, carbon monoxide and ammonia to n-butyramide.

While in the most of the foregoing examples this invention is illustrated as a method for the preparation of organic amides, it will be understood that the method can be adapted to the manufacture of other organic compounds derivable therefrom, particularly nitriles, lactams, etc. Thus, at relatively high temperatures the reaction products frequently contain appreciable amounts of nitriles. When the starting material contains functional groups which may react with the ammonia, or substituted ammonia, the reaction product generally contains more than one nitrogen-bearing substituent group. Esters of unsaturated acids may react with carbon monoxide and ammonia in accordance with the invention to give diamides or amides rather than monoamides.

The invention may be practiced by heating the reactants in any suitable pressure resistant reaction vessel, such as an autoclave, or tubular converter, preferably made of, or lined with, inert materials such as glass, porcelain, inert metals and the like. Outstanding results are obtained in reaction vessels lined with silver. If desired, materials of construction yielding small amounts of cobalt carbonyl may be employed. The process may be conducted batchwise or continuously. In the continuous process, the reactants may be introduced at one or more points within the reaction vessel if desired. In certain instances it is preferred to employ a tubular reaction vessel in which the temperature and pressure are not uniform throughout the length of the vessel. Any suitable inert reaction medium may be employed, whether or not the reactants are soluble therein, but it is preferred to employ a medium in which the reactants are soluble.

Generally, pure carbon monoxide is employed as a reactant according to the invention, but mixtures of gases containing carbon monoxide with hydrogen or inert gases may be utilized if desired, provided the partial pressure of the reactants is sufficient to give rise to the formation of nitrogen-containing reaction products, as hereinbefore described.

The nitrogen-containing compounds obtained in accordance with this invention are highly valuable per se, and are particularly useful for further conversion by known methods to other organic materials, such as monoamines, diamines, monocarboxylic acids, polycarboxylic acids, nitriles, amino acids, lactams, polyamide resins and the like.

I claim:

1. A process for the synthesis of organic amides which comprises introducing into a reaction vessel an olefin hydrocarbon, carbon monoxide, a compound of the class consisting of ammonia, primary amines, and secondary amines, and a catalytic quantity of an organic compound of cobalt which is soluble in at least one of the ingredients of the reaction mixture, heating the resulting mixture at a temperature within the range of 150° to 350° C. under a pressure in excess of 50 atmospheres, separating from the resulting reaction product the amide produced by the ensuing reaction, recovering also cobalt-containing catalyst soluble in at least one of the ingredients of the aforesaid reaction mixture, and recycling the said catalyst to a reaction vessel wherein reaction between the said olefin, carbon monoxide and the said compound of the class consisting of ammonia, primary and secondary amines takes place with the formation of the said amide.

2. The process of claim 1 in which the said olefin is ethylene.

3. The process of claim 1 in which the said olefin is vinyl cyclohexene.

4. The process of claim 1 in which the said olefin is buten-1.

5. The process of claim 1 in which the said catalyst which is introduced into the reaction vessel is a cobalt salt of an organic carboxylic acid.

6. The process of claim 5 in which the catalyst which is introduced into the reaction vessel is cobalt propionate.

7. The process of claim 5 in which the said catalyst which is introduced into the reaction vessel is cobalt naphthenate.

8. The process of claim 5 in which the said catalyst which is introduced into the reaction vessel is cobalt acetate.

9. The process of claim 5 in which the reaction pressure is within the range of 100 to 2000 atmospheres.

10. A process for preparing propionamide which comprises introducing into a reaction vessel ethylene, carbon monoxide, ammonia, and a catalytic quantity of cobalt propionate, heating the resulting mixture at a temperature of 150° to 350° C. under a pressure of 100 to 2000 atmospheres, separating propionamide by distillation from the resulting product whereby a distillation residue containing chemically combined cobalt is produced, and recycling the said residue to a reaction vessel wherein reaction between ethylene, carbon monoxide and ammonia takes place with the formation of propionamide.

11. A process for preparing organic amides which comprises reacting an olefinic hydrocarbon compound with carbon monoxide and a member of the class consisting of ammonia, primary amines and secondary amines, in the presence of a catalytic quantity of a cobalt salt of an organic carboxylic acid, whereby an amido-substituted saturated hydrocarbon is obtained, separating the said amido-substituted hydrocarbon from the resulting mixture, recovering also cobalt-containing catalyst from the resulting mixture, said recovered catalyst being soluble in at least one of the ingredients of the reaction mixture, and converting further quantities of the said olefinic compound, carbon monoxide and member of the class consisting of ammonia, primary amines and secondary amines to the said amide in the presence of the said recovered catalyst.

WILLIAM F. GRESHAM.

REFERENCES CITED

The following references are of record in the file of this patent:

UNITED STATES PATENTS

| Number | Name | Date |
|---|---|---|
| 2,422,631 | Olin et al. | June 17, 1947 |
| 2,422,632 | Olin et al. | June 17, 1947 |